United States Patent [19]

Tscheulin

[11] Patent Number: 5,017,633
[45] Date of Patent: May 21, 1991

[54] FILLED POLYOLEFINS STABILIZED WITH A COMBINATION OF A HINDERED PHENOL AND A PHENYLPHOSPHONITE

[75] Inventor: Guenther Tscheulin, Frick, Switzerland

[73] Assignee: Sandoz Ltd., Basel, Switzerland

[21] Appl. No.: 376,334

[22] Filed: Jul. 6, 1989

Related U.S. Application Data

[63] Continuation of Ser. No. 231,309, Aug. 11, 1988, abandoned, which is a continuation of Ser. No. 103,236, Sep. 30, 1987, abandoned, which is a continuation of Ser. No. 463,347, Feb. 3, 1983, abandoned.

[30] Foreign Application Priority Data

Feb. 8, 1982 [DE] Fed. Rep. of Germany ..... 32042566

[51] Int. Cl.$^5$ .......................... C08K 5/526; C08K 5/34; C08K 5/53; C08K 5/36
[52] U.S. Cl. .................................. 524/117; 524/100; 524/126; 524/135; 524/303; 524/304; 524/305; 524/342; 524/343
[58] Field of Search ............... 524/100, 117, 126, 135, 524/303, 304, 305, 342, 343

[56] References Cited

U.S. PATENT DOCUMENTS 4,075,163  2/1978  Hofer et al. ......................... 524/126
4,406,842  9/1983  Spivack ............................... 558/218

*Primary Examiner*—Kriellion Morgan
*Attorney, Agent, or Firm*—Gerald D. Sharkin; Richard E. Vila; Thomas C. Doyle

[57] ABSTRACT

A filled polyolefin, particularly polypropylene, containing a sterically hindered phenol antioxidant and a compound of formula I and/or II

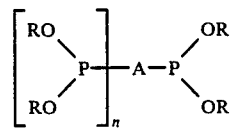

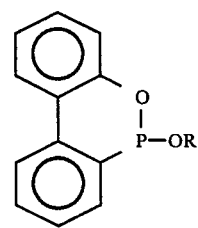

in which R is unsubstituted phenyl or phenyl substituted by 1 or 2 $C_{1-12}$alkyl groups n is 0 or 1 and A is a monofunctional or difunctional residue of a phenyl, diphenyl, diphenyl ether, diphenylmethane or dibenzofuran, as processing stabilizer has good long-term stability even in the absence of conventional sulphur-containing co-stabilizers.

32 Claims, No Drawings

FILLED POLYOLEFINS STABILIZED WITH A COMBINATION OF A HINDERED PHENOL AND A PHENYLPHOSPHONITE

This is a continuation of application Ser. No. 07/231,309, filed Aug. 11, 1988 now abandoned which in turn is a continuation of application Ser. No. 07/103,236, filed Sept. 30, 1987 now abandoned, which in turn is a continuation of application Ser. No. 06/463,347, filed Feb. 3, 1983, now abandoned.

This invention relates to long-term stabilization of filled polyolefins.

When a polyolefin contains a filler such as talc, its stability is considerably reduced because the filler accelerates the thermal and photochemical oxidation of the polymer. The filler also strongly reduces the activity of sterically hindered phenols, which are used as base stabilizers (long-term stabilizers) in polyolefins. It is therefore necessary, for filled polyolefins, to use not only a sterically hindered phenol antioxidant but also a costabilizer to increase its effect. Such co-stabilizers are primarily sulphur compounds, for example distearyl thiodipropionate. It is however desirable to avoid the use of such sulphur compounds, mainly because of their unpleasant smell, but also because they may react with or decrease the activity of other additives, for example light stabilizers.

Besides the base stabilizer, it is also necessary to use a processing stabilizer to protect the polyolefin from thermal degradation while it is exposed to the high processing temperature. It has now been found that a selected group of compounds known as processing stabilizers in unfilled polyolefins also have the property of acting as long-term co-stabilizers in filled polyolefins containing sterically hindered phenols, so that the use of additional sulphur-containing co-stabilizers can be dispensed with.

Accordingly, the present invention provides a filled polyolefin containing a sterically hindered phenol and a compound of formula I and/or II

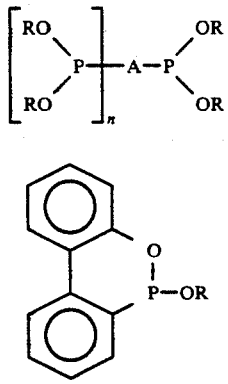

in which
R is unsubstituted phenyl or phenyl substituted by 1 or 2 $C_{1-12}$alkyl groups
n is 0 or 1 and
A is a monofunctional or difunctional residue of a phenyl, diphenyl, diphenyl ether, diphenylmethane or dibenzofuran.

The compounds of formula I are preferred.

Preferably R is a dialkyl phenyl group, more preferably a 2,4-dialkyl phenyl group, particularly one in which the 2-alkyl group is branched. It is further preferred that the 4-alkyl group is also branched, and the most preferred R group is 2,4-di-tert.-butylphenyl. In compounds of formula I, the groups R may be the same or different, but are preferably identical. Mixtures of compounds of formula I and/or formula II may be used.

When A is the residue of a phenyl group, n is preferably 0; for other significances of A, n is preferably 1. Preferably A is a residue of a phenyl, diphenyl or diphenyl ether group, more preferably 4,4'-diphenylene or 4,4'-diphenyl ether.

The sterically hindered phenol may be one of the known 2,6-dialkyl phenol derivatives, particularly a derivative of 2,6-di-tert.-butylphenyl or 2-methyl-6-tert.-butylphenyl. Examples of such compounds are:

β-(4-hydroxy-3,5-di-t-butylphenyl)propionic acid stearyl ester, tetrakis-[methylene-3-(3',5'-di-t-butyl-4-hydroxyphenyl-) propionate]methane
1,3,3-tris-(3-methyl-4-hydroxy-5-t-butylphenyl)butane
1,3,5-tris-(4-t-butyl-3-hydroxy-2,6-dimethylbenzyl)-1,3,5-triazin -2,4,6-(IH,3H,5H)trione
bis(4-t-butyl-3-hydroxy-2,6-dimethylbenzyl)dithiol-terephthalate
tris(3,5di-t-butyl-4-hydroxybenzyl)isocyanurate
triester of 3,5-di-t-butyl-4-hydroxy-hydrocinnamic acid with 1,3,5-tris-(2-hydroxyethyl)-5-triazone-2,4,6-(IH,3H,5H)trione
bis[3,3-bis-(4-hydroxy-3-t-butylphenyl)butyric acid]-glycol ester
1,3,5-trimethyl-2,4,6-tris-(3,5-di-t-butyl-4-hydroxybenzyl) benzene
2,2'-methylene-bis-(4-methyl-6-t-butylphenyl)terephthalate
4,4'-methylene-bis-(2,6-di-t-butylphenyl)
4,4'-butylidene-bis-(6-t-butyl-m-cresol)
and 2,2'-methylene-bis-(4-methyl-6-t-butylphenyl).

Suitable fillers include chalk, glass fibers, talc or aluminum hydroxide. Preferred fillers are chalk and talc, particularly talc. Filled polyolefin is taken to be polymer containing at least 5% by wt. of filler, calculated on the total weight. Conventional filled polyolefins may however contain 10–50% wt. of filler, preferably 20–40 wt. %, calculated on the total weight.

The concentration of the sterically hindered phenol present will be that required to give effective long-term stabilization in filled polyolefin in the presence of a col-stabilizer of formula I or II. this will generally be the same as is conventionally used in conjunction with a sulphur-containing co-stabilizer, for example from 0.02 to 0.4% by weight based on the total weight of polymer and filler, preferably from 0.05 to 0.2% by weight.

The concentration of the compound of formula I or II will be that required to give effective long-term stabilization when used as a co-stabilizer with effective quantities of a sterically hindered phenol. Preferably the concentration is from 0.02 to 0.4, more preferable from 0.05 to 0.2% by wt. based on the total weight of polymer and filler.

The weight ratio of sterically hindered phenol to compound of formula I and/or II is preferably from 2:1 to 1:3, more preferably from 1:1 to 1:2.

Suitable polyolefin resins include polyethylene, polypropylene, ethylene/propylene copolymers and polybutylene, of which polypropylene is preferred. The polypropylene may be of high or low molecular weight, and may be atactic or isotactic but filled polypropylene will normally be standard atactic polymer.

Polyolefin resins are generally sold by their manufacturers already base-stabilized; that is, they will normally already contain a long-term stabilizer (antioxidant) based on a sterically hindered phenol. When this is the case, the filled polyolefin of the invention may be produced by mixing the compound of formula I or II and the filler with molten base-stabilized polyolefin.

This may be done in conventional manner in a single mixing operation for example in a kneader or roll mixer, or with simultaneous formation into shaped articles in an extruder or screw injection molding machine, whereby articles such as rods, tubes, container, bottles, profiles, foams and coated metal wires may be produced. Alternatively the compound of formula I or II may be melt blended with one portion of polyolefin, the filler with a second portion, and the two portions then melt-blended together. Master batch compositions containing the polyolefin together with a high concentration of col-stabilizer and/or filler may be made and then blended into larger quantities of polyolefin. Where the polyolefin does not already contain the base stabilizer, this may be added at any stage of the melt-blending operations described above.

Other stabilizers and col-stabilizers may be used in the filled polyolefin of the present invention, but this is not necessary since the combination of the sterically hindered phenol and the compound of formula I or II provides good stabilization both during processing and in the long-term. It is preferred that no significant quantity of any sulphur-containing co-stabilizer is present, more preferably no significant quantity of any sulphur-containing compound. It is also preferred that no significant quantity of any compound other than a compound of formula I or II is present which has the property of increasing the stabilizing effect of sterically hindered phenols against long-term thermal and photo-chemical oxidation of the polyolefin. Accordingly, the invention also provides a filled polyolefin containing as the sole stabilizer against oxidation, a stabilizing-effective amount of a combination consisting of (a) one or more sterically hindered phenols and (b) one or more compounds of formula I and/or II.

This does not exclude the presence of other types of stabilizers such as UV absorbers and light stabilizers such as 2-(2'-hydroxyphenyl)-benztriazoles, 2-hydroxybenzophenones, 1,3-bis-(2'-hydroxybenzoyl)benzenes, salicylates, cinnamates, esters of optionally substituted benzoic acid, sterically hindered amines and oxalic acid diamides.

Further additives, for example flame retardants and antistatic agents, may also be present.

The term 'long-term stabilization' used herein means stabilization against thermal and oxidative degradation taking place under conditions of use after the material has been processed.

The following Examples, in which all percentages are by weight, illustrate the invention.

EXAMPLE 1

(i) preparation of filled polymer 100 g Polypropylene (Profax 6501, Hercules Inc., Wilmington, Del., U.S.A.) base-stabilized with 0.2% of an antioxidant of formula

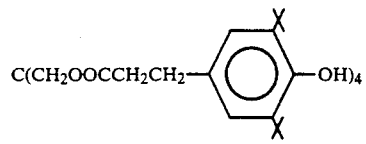

and 0.1% calcium stearate is intensively mixed with 20 g commercial talc and 0.1% of tetrakis (2,4-di-t-butylphenyl)4,4'-diphenylene diphosphonite (compound of formula I, R=2,4-di-t-butylphenyl, A=4,4'-diphenylene, n=1). The mixture is melt blended in an extruder at approx. 250° C., and the extrudate is granulated then pressed in a 2-ton press at 190° C. into 0.5 mm thick plates.

Control plates are similarly prepared from Profax 6501 plus talc in the absence of compound of formula I, and comparative examples are prepared using in place of compound of formula I two different commercial processing stabilizers outside the scope of the present invention, as shown in Table I below. Plates are also pressed from unfilled polypropylene containing the same stabilizers.

(ii) testing

The same plates are stored in a circulating air oven at 150°±0.5° C., and examined daily for signs of cracking. The number of days storage until the onset of visible cracking is recorded. The results are shown in Table I.

TABLE I

| | Profax 6501 | | |
|---|---|---|---|
| | | No. of days stability at 150° C. | |
| | processing stabiliser | in unfilled PP | in filled PP (20% talc) |
| 1a | none | 60 | 19 |
| 1b | tetrakis-(2,4-di-t-butylphenyl)-4,4'-diphenylene diphosphonite | 60 | 44 |
| 1c | R—O—P(O—)(O—)P—O—R  R = C₁₈H₃₇ | 58 | 20 |
| 1d | (formula) | 57 | 16 |

The results show that none of the processing stabilizers increase long-term stability in unfilled polypropylene, whereas in filled polypropylene only the compound of formula I has any costabilizing effect.

EXAMPLE 2

Example 1 is repeated using, instead of Profax 6501, polypropylene of lower stability (Isplen, Enpetrol S.A., Spain), which also contains 0.2% of

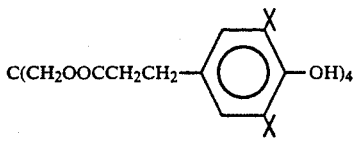

as base stabilizer. Similar results are obtained, as shown in Table II.

TABLE II

| No. | processing stabilizer | Isplen No. of days stability at 150° C. | |
|---|---|---|---|
| | | in unfilled PP | in filled PP (20% talc) |
| 2a | none | 30 | 6 |
| 2b | as 1b | 30 | 19 |
| 2c | as 1c | 29 | 7 |
| 2d | as 1d | 28 | 7 |

EXAMPLES 3–8

Examples 1b and 2b are repeated, using in place of tetrakis(2,4-di-t-butylphenyl)-4,4'-diphenylene diphosphonite the following compounds of formula I:

| Example No. | R | A | n |
|---|---|---|---|
| 3,4 | 2,4-di-t-butylphenyl | (phenyl) | 0 |
| 5,6 | 2,4-di-t-butylphenyl | (diphenyl ether) | 1 |
| 7,8 | 2,4-di-t-butylphenyl | (dibenzofuran) | 1 |

Similar good results are obtained.

I claim:

1. A filled polyolefin containing a stabilizing-effective combined amount of (a) a sterically hindered phenol and (b) one or more compounds of formula I

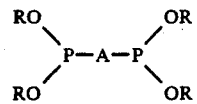

in which each R may be the same or different and is unsubstituted phenyl or phenyl substituted by one or two $C_{1-12}$ alkyl groups, and A is a difunctional residue of phenyl, diphenyl or dibenzofuran, and containing no significant quantity of any sulphur-containing co-stabilizer for sterically hindered phenols.

2. A filled polyolefin according to claim 1 containing no significant quantity of any sulphur-containing stabilizer.

3. A filled polyolefin according to claim 1 containing no significant quantity of any sulphur-containing compound.

4. A filled polyolefin containing, as the sole stabilizer against oxidation, a stabilizing-effective amount of a combination consisting of (a) one or more sterically hindered phenols and (b) one or more compounds of formula I, stated in claim 1.

5. A filled polyolefin according to claim 1 containing a compound of formula I in which each group R is a 2,4-di-t-butyl phenyl group.

6. A filled polyolefin according to claim 1 containing 10–50% wt. of filler, calculated on the total weight.

7. A filled polyolefin according to claim 1, containing from 0.02 to 0.4% by weight of sterically hindered phenol and 0.02 to 0.4% by weight of a compound of formula I based on the total weight of polymer and filler.

8. A filled polyolefin according to claim 1 wherein each R is dialkylphenyl.

9. A filled polyolefin according to claim 4 wherein each R is dialkylphenyl.

10. A filled polyolefin according to claim 1 wherein the sterically hindered phenol is a 2,6-dialkylphenyl derivative.

11. A filled polyolefin according to claim 9 wherein the sterically hindered phenol is a derivative of 2,6-di-tert-butylphenyl or of 2-methyl-6-tert-butylphenyl.

12. A filled polyolefin according to claim 9 containing from 0.02 to 0.4% by weight of sterically hindered phenol and 0.02 to 0.4% by weight of a compound of formula I based on the total weight of polymer and filler.

13. A filled polyolefin according to claim 11 containing from 0.02 to 0.4% by weight of sterically hindered phenol and 0.02 to 0.4% by weight of a compound of formula I based on the total weight of polymer and filler.

14. A filled polyolefin according to claim 13 containing 10–50% wt. of filler, calculated on the total weight.

15. A filled polyolefin according to claim 14 wherein the filler is chalk, talc, glass fibers or aluminum hydroxide.

16. Filled polypropylene according to claim 14.

17. A filled polyolefin according to claim 5 containing no sulphur-containing stabilizer.

18. A filled polyolefin according to claim 1 containing no sulphur-containing stabilizer.

19. A filled polyolefin according to claim 17 containing 10–50%, by weight, of filler calculated on the total weight.

20. A filled polyolefin according to claim 18 containing 10–50%, by weight, of filler calculated on the total weight.

21. A filled polyolefin according to claim 19 containing 0.02 to 0.4%, by weight, of sterically hindered phenol and 0.02 to 0.4%, by weight, of compound of formula I.

22. A filled polyolefin according to claim 20 containing 0.02 to 0.4%, by weight, of sterically hindered phenol and 0.02 to 0.4%, by weight, of compound of formula I.

23. Filled polypropylene according to claim 21 wherein the filler is chalk, talc, glass fibers or aluminum hydroxide.

24. Filled polypropylene according to claim 22 wherein the filler is chalk, talc, glass fibers or aluminum hydroxide.

25. A filled polyolefin according to claim 1 in which, in the compound of formula I, A is 4,4'-diphenylene.

26. A filled polyolefin according to claim 25 wherein, in the compound of formula I, each R is 2,4-di-t-butylphenyl.

27. A filled polyolefin according to claim 1 wherein the sterically hindered phenol is selected from the group consisting of
-(-b 4-1 -hydroxy-3,5-di-t-butylphenyl)propionic acid stearyl ester,
tetrakis-[methylene-3-(3',5'-di-t-butyl-4-hydroxyphenyl-) propionate]methane,
1,3,3,-tris-(3-methyl-4-hydroxy-5-t-butylphenyl)butane,
1,3,5-tris-(4-t-butyl-3-hydroxy-2,6-dimethylbenzyl)-1,3,5-triazin-2,4,6-(1H,3H,5H)trione, bis(4-t-butyl-3-hydroxy-2,6-dimethylbenzyl)dithiolterephthalate,
tris(3,5-di-t-butyl-4-hydroxybenzyl)isocyanurate, triester of 3,5-di-t-butyl-4-hydroxy-hydrocinnamic acid with
1,3,5-tris-(2-hydroxyethyl)-5-triazine-2,4,6-(1H, 3H, 5H)trione,
bis[3,3,-bis-(4'-hydroxy-3-t-butylphenyl)butyric acid]-glycol ester,
1,3,5-trimethyl-2,4,6-tris-(3,5-di-t-butyl-4-hydroxybenzyl) benzene,
2,2'-methylene-bis-(4-methyl-6-t-butylphenyl)terephthalate,
4,4,'-methylene-bis-(2,6-di-t-butylphenyl),
4,4,'-butylidene-bis-(6-t-butyl-m-cresol) and
2,2,'-methylene-bis-(4-methyl-6-t-butylphenyl).

28. A filled polyolefin according to claim 7 containing 10–50%, by weight, of filler, calculated on the total weight.

29. A filled polyolefin according to claim 8 in which, in the compound of formula I, A is 4,4'-diphenylene.

30. Filled polypropylene according to claim 16 in which, in the compound of formula I, A is 4,4'-diphenylene.

31. A filled polyolefin according to claim 23 in which, in the compound of formula I, A is 4,4'-diphenylene.

32. A filled polyolefin according to claim 29 in which, in the compound of formula I, each R is 2,4-dialkylphenyl in which both alkyl groups are branched.

* * * * *